(12) United States Patent
Batra et al.

(10) Patent No.: US 9,299,370 B1
(45) Date of Patent: Mar. 29, 2016

(54) MIMO READ HEAD WITH SOFT BIAS AND SPLIT SHIELD

(71) Applicant: HGST Netherlands B.V., Amsterdam (NL)

(72) Inventors: Sharat Batra, Plymouth, MN (US); Neil Smith, San Jose, CA (US); Petrus A. Van Der Heijden, Cupertino, CA (US); Howard G. Zolla, Los Gatos, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/644,564

(22) Filed: Mar. 11, 2015

(51) Int. Cl.
G11B 5/39 (2006.01)

(52) U.S. Cl.
CPC ............ *G11B 5/3958* (2013.01); *G11B 5/3912* (2013.01)

(58) Field of Classification Search
CPC .. G11B 5/3945; G11B 5/3948; G11B 5/3951; G11B 5/3954; G11B 5/3958; G11B 5/3961; G11B 5/3967; G11B 5/3912
USPC ................................................. 360/316, 319
See application file for complete search history.

(56) References Cited

U.S. PATENT DOCUMENTS

| | | | |
|---|---|---|---|
| 4,853,631 A | 8/1989 | Carmen | |
| 5,323,285 A | 6/1994 | Smith | |
| 5,388,014 A | 2/1995 | Brug et al. | |
| 5,696,654 A | 12/1997 | Gill et al. | |
| 6,717,780 B2 | 4/2004 | Hiramoto et al. | |
| 8,711,517 B2 | 4/2014 | Erden et al. | |
| 8,780,506 B1* | 7/2014 | Maat | G11B 5/3912 360/319 |
| 8,873,204 B1* | 10/2014 | Gao | G11B 5/3912 360/319 |
| 8,970,988 B1* | 3/2015 | Li | G11B 5/2652 360/235.4 |
| 9,042,058 B1* | 5/2015 | Li | G11B 5/3912 360/316 |
| 9,042,059 B1* | 5/2015 | Katine | G11B 5/3909 360/316 |
| 9,082,436 B1* | 7/2015 | Mashima | G11B 5/3929 |
| 9,087,527 B1* | 7/2015 | Li | G11B 5/02 |
| 2011/0069413 A1* | 3/2011 | Maat | B82Y 10/00 360/234.3 |
| 2013/0286511 A1 | 10/2013 | Edelman et al. | |
| 2014/0160590 A1 | 6/2014 | Sankaranarayanan et al. | |
| 2014/0177102 A1* | 6/2014 | Kief | G11B 5/3163 360/128 |
| 2015/0062735 A1* | 3/2015 | Sapozhnikov | G11B 5/115 360/46 |
| 2015/0062755 A1* | 3/2015 | Sapozhnikov | G11B 5/3951 360/235.4 |
| 2015/0098151 A1* | 4/2015 | Gadbois | G11B 5/29 360/234.5 |
| 2015/0098152 A1* | 4/2015 | Gadbois | G11B 5/4853 360/234.5 |
| 2015/0255092 A1* | 9/2015 | Macken | G11B 5/3951 360/324 |

OTHER PUBLICATIONS

Batra et al., U.S. Appl. No. 14/194,552, filed Feb. 28, 2014.
Tsang et al., "Gigabit Density Recording Using Dual-Element MR/Inductive Heads on Thin-Film Disks," IEEE Transactions on Magnetics, vol. 26, No. 5, Sep. 1990, pp. 1689-1693.

* cited by examiner

*Primary Examiner* — Will J Klimowicz
(74) *Attorney, Agent, or Firm* — Zilka-Kotab, PC

(57) ABSTRACT

A system, according to one embodiment, includes a magnetic head having sensor structures disposed laterally along a cross-track direction, each sensor structure having a free layer, a soft bias layer positioned laterally to each sensor structure, an antiparallel coupling layer above each soft bias layer, a magnetic layer above each antiparallel coupling layer, wherein magnetic moments of the soft bias layer and the magnetic layer are antiparallel coupled, and a stabilizing layer above each magnetic layer for stabilizing a magnetic orientation of the magnetic layer. Moreover, opposing faces of the magnetic layers are positioned apart by a distance that causes each magnetic layer to form a magnetic circuit with the associated free layer and the associated soft bias layer.

21 Claims, 3 Drawing Sheets

MIMO READ HEAD WITH SOFT BIAS AND SPLIT SHIELD

FIELD OF THE INVENTION

The present invention relates to data storage systems, and more particularly, this invention relates to multiple-input and multiple-output (MIMO) read heads having soft bias layers which may also be capable of improving linear resolution and track pitch.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to meeting this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles, particularly for two dimension magnetic recording (TDMR) systems which require two or more sensors in the same head, e.g., MIMO heads. Signals received from the two or more sensors may then be processed to extract data encoded on a magnetic medium.

Several preexisting MIMO head designs include multiple sensors which are displaced in the down track direction. However, multiple sensors displaced in the track direction gives rise to significant alignment issues resulting from skew between the sensors and the corresponding tracks as misalignment and/or skew is compounded along the length of the displaced sensors. This causes positional tolerances and skew issues to become problematic. As a result, although the optimal sensor positioning is the cross-track direction for MIMO heads rather than having multiple sensors displaced in the track direction, it has previously been effectively unachievable.

SUMMARY

Various embodiments described herein include MIMO heads having more than one sensor structure disposed laterally along a cross-track direction thereof, as will be described in further detail below.

A system, according to one embodiment, includes a magnetic head having sensor structures disposed laterally along a cross-track direction, each sensor structure having a free layer, a soft bias layer positioned laterally to each sensor structure, an antiparallel coupling layer above each soft bias layer, a magnetic layer above each antiparallel coupling layer, wherein magnetic moments of the soft bias layer and the magnetic layer are antiparallel coupled, and a stabilizing layer above each magnetic layer for stabilizing a magnetic orientation of the magnetic layer. Moreover, opposing faces of the magnetic layers are positioned apart by a distance that causes each magnetic layer to form a magnetic circuit with the associated free layer and the associated soft bias layer.

A system, according to another embodiment, includes a magnetic head having sensor structures disposed laterally along a cross-track direction, each sensor structure having a free layer, a soft bias layer positioned laterally to each sensor structure, an antiparallel coupling layer above each soft bias layer, a magnetic layer above each antiparallel coupling layer, wherein magnetic moments of the soft bias layer and the magnetic layer are antiparallel coupled, and a stabilizing layer above each magnetic layer for stabilizing a magnetic orientation of the magnetic layer. A magnetic moment of each magnetic layer may exceed a magnetic moment of any portion of the soft magnetic layer above the associated free layer. Moreover, opposing faces of the magnetic layers are positioned apart by a distance that causes each magnetic layer to form a magnetic circuit with the associated free layer and the associated soft bias layer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
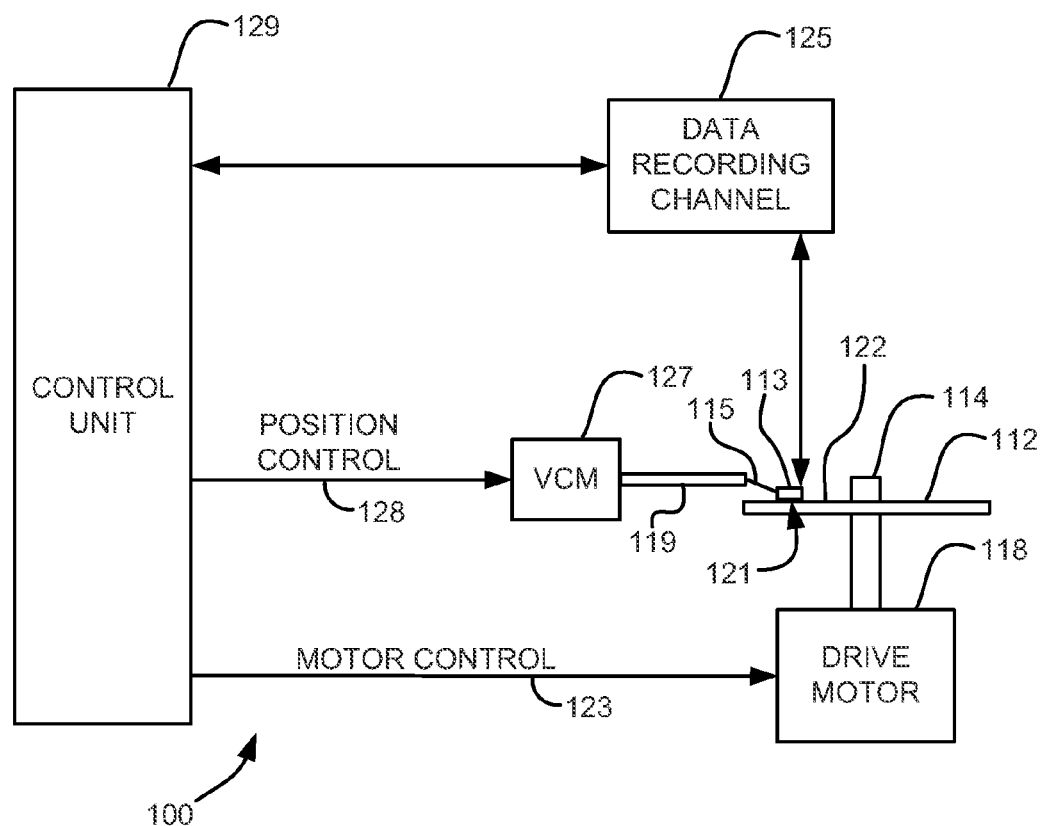
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods including MIMO heads having more than one sensor structure disposed laterally along the cross-track direction thereof, as well as operation and/or component parts thereof. Various embodiments described herein may additionally include adequate magnetic shielding for each of the laterally deposed sensor structures, preferably in addition to electrically insulating the sensor structures.

In one general embodiment, a system includes a magnetic head having sensor structures disposed laterally along a cross-track direction, each sensor structure having a free layer, a soft bias layer positioned laterally to each sensor structure, an antiparallel coupling layer above each soft bias layer, a magnetic layer above each antiparallel coupling layer, wherein magnetic moments of the soft bias layer and the magnetic layer are antiparallel coupled, and a stabilizing layer above each magnetic layer for stabilizing a magnetic orientation of the magnetic layer. Moreover, opposing faces of the magnetic layers are positioned apart by a distance that causes each magnetic layer to form a magnetic circuit with the associated free layer and the associated soft bias layer.

In another general embodiment, a system includes a magnetic head having sensor structures disposed laterally along a cross-track direction, each sensor structure having a free layer, a soft bias layer positioned laterally to each sensor structure, an antiparallel coupling layer above each soft bias layer, a magnetic layer above each antiparallel coupling layer, wherein magnetic moments of the soft bias layer and the magnetic layer are antiparallel coupled, and a stabilizing layer above each magnetic layer for stabilizing a magnetic orientation of the magnetic layer. A magnetic moment of each magnetic layer may exceed a magnetic moment of any portion of the soft magnetic layer above the associated free layer. Moreover, opposing faces of the magnetic layers are positioned apart by a distance that causes each magnetic layer to form a magnetic circuit with the associated free layer and the associated soft bias layer.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved over disk surface 122 so that portions 121 may access different tracks of the disk where desired data are recorded and/or to be written.

The composition of the magnetic read/write portions 121 of disk drive 100 may vary depending on the desired embodiment. According to some approaches, the magnetic read/write portions 121 may include piggyback reader/writer pairs. The piggyback reader/writer pairs may be configured such that the writer and reader of each pair are aligned in a direction substantially parallel to a relative direction of media travel thereover (i.e., the down-track or track direction). Moreover, it should be noted that the various reader/writer configurations described above may be of conventional materials and design, as would be understood by one skilled in the art.

Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap may be formed between the first and second pole piece layers of the write portion by a gap layer at or near a media facing side of the head (sometimes referred to as an ABS in a disk drive). The pole piece layers may be connected at a back gap. Currents are conducted through the coil layer, which produce magnetic fields in the pole pieces. The magnetic fields at the ABS write bits of magnetic information in tracks on moving media, such as in circular tracks on a rotating magnetic disk.

As previously mentioned, several preexisting MIMO heads include multiple sensors which are displaced in the track direction. As a result of positioning the sensors in such configurations, positional tolerances and skew issues become problematic for conventional MIMO heads. As a result, optimal sensor positioning in the cross-track direction for MIMO heads having multiple sensors displaced in the down track direction is achievable only in a limited skew range.

Other preexisting MIMO transducers have attempted to implement multiple sensors in different configurations, however, these attempts have resulted in degraded linear resolution, poor stability, undesirably significant increases in shield-to-shield spacing, and a complete lack of side shielding.

Conversely, various embodiments described herein include MIMO heads having more than one sensor structure disposed laterally in the cross-track direction. It follows that approaches described herein preferably incorporate some number of side by side sensors, but are in no way limited thereto. For example, according to some approaches, sensors may be stacked, e.g., above and/or below other sensors.

It is preferred that the embodiments described herein are capable of electrically insulating the sensor structures from one or more of the shields, while also providing magnetic shielding for each of the sensor structures. Thus, implementing the aforementioned laterally deposited sensor structures may include soft magnetic layers, to bias and shield the sensor structures. The magnetic moments of soft magnetic materials are exchange coupled, as opposed to hard bias materials which have fixed islands of magnetic moments. As a result, grains of soft magnetic materials are strongly coupled and point in a common direction, even for small amounts of material. Thus, soft magnetic materials are able to achieve much higher yield over hard magnetic materials. Embodiments implementing soft magnetic layers may desirably include improved stability and linear resolution, as will be described in further detail below. However, it should be noted that although the exchange coupled magnetic moments of soft magnetic materials are preferably used to bias and shield the sensor structures disclosed herein, in some approaches, hard bias materials and/or other biasing materials may be included in any of the sensor structures disclosed herein as would be appreciated by one skilled in the art upon reading the present description.

Figure 2A:
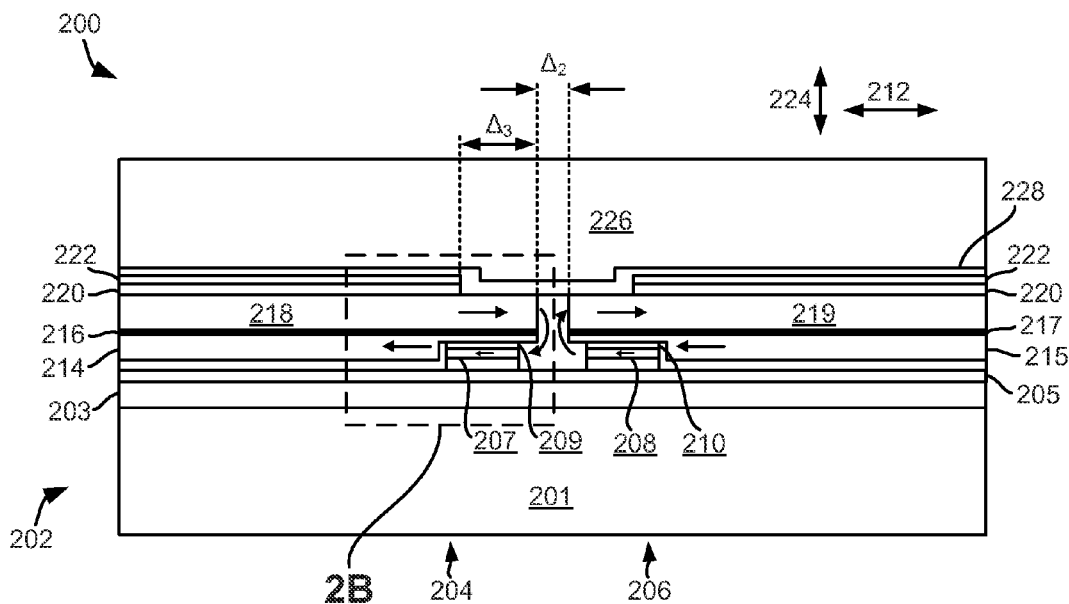
FIG. 2A is a partial view of a media facing side of a magnetic head in accordance with one embodiment.
Figure 2B:
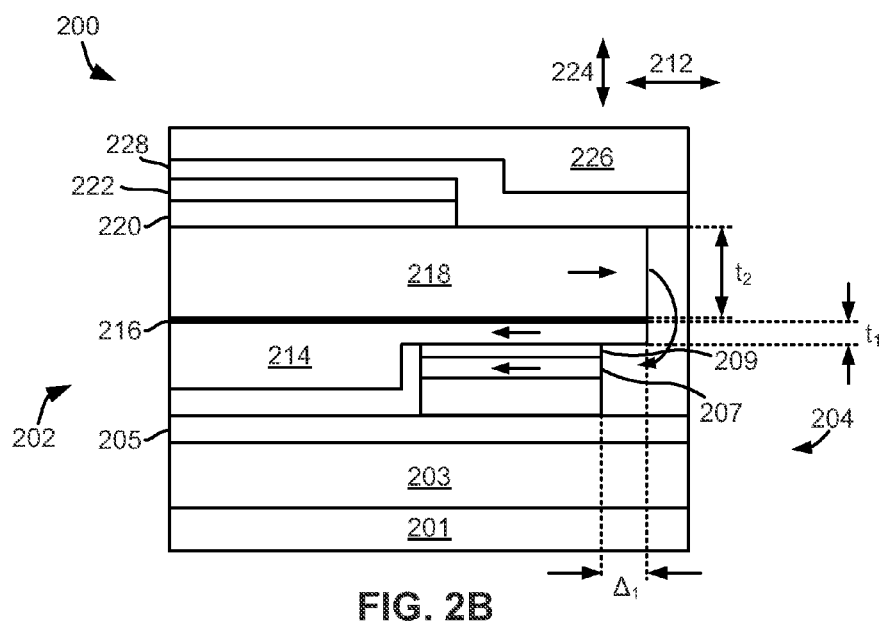
FIG. 2B is a detailed view of the embodiment illustrated in FIG. 2A taken from box 2B of FIG. 2A.

Referring now to FIGS. 2A-2B, a system 200 is illustrated, in accordance with one embodiment. As an option, the present system 200 may be implemented in conjunction with features from any other embodiment listed herein, such as those described with reference to the other FIGS. However, such system 200 and others presented herein may be used in various applications and/or in permutations which may or may not be specifically described in the illustrative embodiments listed herein. Further, the system 200 presented herein may be used in any desired environment. Thus FIGS. 2A-2B and 3A-3B may be deemed to include any possible permutation.

As depicted, system 200 includes a magnetic head 202 having a bottom shield 201, a magnetically pinned reference layer 203 and a spacer layer 205. According to some approaches, spacer layer 205 may include MgO, but is in no way limited thereto.

The magnetic head 202 additionally includes sensor structures 204, 206. According to various embodiments, the sensor structures 204, 206 may include, but are not limited to, TMR, Scissor-TMR, CPP GMR, etc. or other spin valve CPP readers.

As a preliminary matter, it should be noted that although the various embodiments described and/or illustrated herein include two sensor structures, a magnetic head according to other embodiments may include additional sensor structures. It follows that any of the approaches described herein may be used in combination with alternative sensor structure configurations, e.g., alternative MIMO implementations. Exemplary configurations and implementations of embodiments having more than two sensor structures are described in detail in U.S. patent application Ser. No. 14/194,552 filed Feb. 28, 2014 which is hereby incorporated by reference.

Referring still to FIGS. 2A-2B, each sensor structure 204, 206 includes a free layer 207, 208 and caps 209, 210. However, according to various approaches, sensor structures 204, 206 may also include additional sensor structure layers which would be apparent to one of ordinary skill in the art upon reading the present description. Thus, additional layers may be present. Moreover, unless otherwise specified, the various layers in this and other embodiments may be formed using conventional processes.

Sensor structures 204, 206 are preferably disposed laterally and aligned along the cross-track direction 212 as shown. However, although it is preferred that the sensor structures are aligned with each other along the cross-track direction 212, in alternative approaches the sensor structures may be positioned differently, e.g., the sensor structures may be laterally disposed but at least partially offset, or shifted, from one another along the track direction, 224.

Magnetic head 202 further includes soft bias layers 214, 215 positioned laterally to each sensor structure 204, 206. The soft bias layers 214, 215 act as side shields, thereby shielding the sensor structures 204, 206 from the signal of neighboring tracks and preventing read interference. According to an illustrative approach, the soft bias layers 214, 215 may include, but are not limited to, NiFe and/or alloys thereof having material ratios from about 45/55 to about 96/4.

With continued reference to FIGS. 2A-2B, antiparallel coupling (APC) layers 216, 217 are positioned above the soft bias layers 214, 215, and the magnetic layers 218, 219 are positioned above the APC layers 216, 217. According to an illustrative approach, APC layers 216, 217 may include Ru or other conventional APC materials. Moreover, illustrative materials for the magnetic layers 218, 219; free layers 207, 208; and/or other magnetic layers disclosed herein may include NiFe, Co, CoFe, etc., and/or alloys thereof.

Sandwiching the APC layers 216, 217 between each respective pair of the soft bias layers 214, 215 and the magnetic layers 218, 219 may desirably cause the magnetic moments of the soft bias layers 214, 215 and the magnetic layer 218, 219 of each pair to be antiparallel coupled. The antiparallel coupled magnetic moments for soft bias layers 214, 215 and magnetic layers 218, 219 have been represented in FIG. 2A and the exploded view of FIG. 2B by the arrows included in the respective layers according to an exemplary approach. Although it is shown in FIGS. 2A and 2B that the magnetic moment of the magnetic layers 218, 219 are directed towards the right of the system 200, while the magnetic moment of the soft bias layers 214, 215 are directed towards the left of the system 200, the magnetic moments may be oriented differently in alternate approaches.

The magnetic layers 218, 219 and the soft bias layers 214, 215 preferably provide a bias field and/or a stray field at the free layer 207, 208, e.g., as a part of a magnetic circuit formed between each magnetic layer 218, 219 and corresponding soft bias layer 214, 215 pair, as will be described in further detail below. Moreover, the magnetic layers 218, 219 may also act as upper shields, thereby preferably providing magnetic shielding for the associated sensor structure 204, 206. e.g., particularly the free layers 207, 208, from the magnetic signal of nearby data written to a current data track. Thus, the soft bias layers 214, 215 in combination with the magnetic layers 218, 219 may magnetically shield the associated free layers 207, 208 from the magnetic signals of nearby data in both the cross-track direction 212 and the down-track direction 224 as would be appreciated by one skilled in the art upon reading the present description.

Magnetic head 202 further includes a stabilizing layer 220, e.g., an antiferromagnetic (AFM) layer, another antiparallel pinned layer, etc., positioned above each magnetic layer 218, 219. The stabilizing layers 220 preferably stabilize (e.g., magnetically pin) the magnetic orientation of the respective magnetic layers 218, 219. Furthermore, an upper lead 222 is positioned above each stabilizing layer 220. Each of the upper leads 222 is preferably in electrical communication with the respective magnetic layer 218, 219, e.g., for reducing an electrical resistance of the electrical path to the associated sensor structure 204, 206. A metallic, electrically conductive material may be used to form the upper leads 222 which also is preferably highly conductive, thereby reducing the resistivity of the signal path. Illustrative materials for the upper leads 222 may include tungsten, alpha-tantalum, copper, gold, etc., or other conventional lead materials.

It follows that, according to some embodiments, each upper lead 222 may offer a unique electrical connection to a respective sensor structure 204, 206. As a result, each sensor structure 204, 206 may be independently addressed without affecting the performance and/or signal of the other sensor structure. It follows that, in some approaches, the bottom shield 201 may act as a common lower lead for the sensor structures 204, 206. Although the sensor structures 204, 206 may share a common lower lead, each upper lead's 222 unique electrical connection to each of the respective sensor structures 204, 206 preserves independent addressing functionality. Moreover, the same may be true for implementations having more than two sensor structures, in that all sensor structures which have a unique lead (e.g., electrical connection) may also share a common lead.

Magnetic head 202 further includes an optional upper shield 226 above the magnetic layers 218, 219. An insulating layer 228 may be positioned between the upper shield 226 and portions of the magnetic layers 218, 219 as well as the upper leads 222, for insulating the upper shield 226 therefrom. According to some embodiments, the insulating layer 228 may allow for the upper shield 226 to be coupled to one sensor structure 204 or the other 206 (but not both). However, as stated, the upper shield 226 is optional and therefore may be absent in other embodiments.

As previously mentioned, a magnetic circuit created between each pair of magnetic and soft bias layers 218, 219, 214, 215 (e.g., by the flux exchanged therebetween) preferably biases the free layers 207, 208. A magnetic circuit has been represented in the current embodiment of FIGS. 2A-2B by the arrows. Thus, flux closure at the end of each magnetic layer 218, 219 may bias the associated sensor structure 204, 206, and therefore the free layers 207, 208, properly.

According to an illustrative approach, the free layers 207, 208 may be cross-track biased by the stray fields (represented by the curved arrow) which emanate from the edge of each magnetic layer 218, 219 and into the respective soft bias layer 214, 215. The dimensions and relative positioning of the various components introduced in FIGS. 2A-2B may affect the overall performance of the magnetic head 202 and/or system 200 as a whole, e.g., by changing the aforementioned magnetic circuit. It follows that the dimensions and orientation of the components may vary, e.g., depending on the desired embodiment. However, it should be noted that one skilled in the art, after being apprised of the teachings herein, would be readily able to determine the desired dimensions and/or materials of the various components according to various approaches herein without resorting to undue experimentation.

Figure 3A:
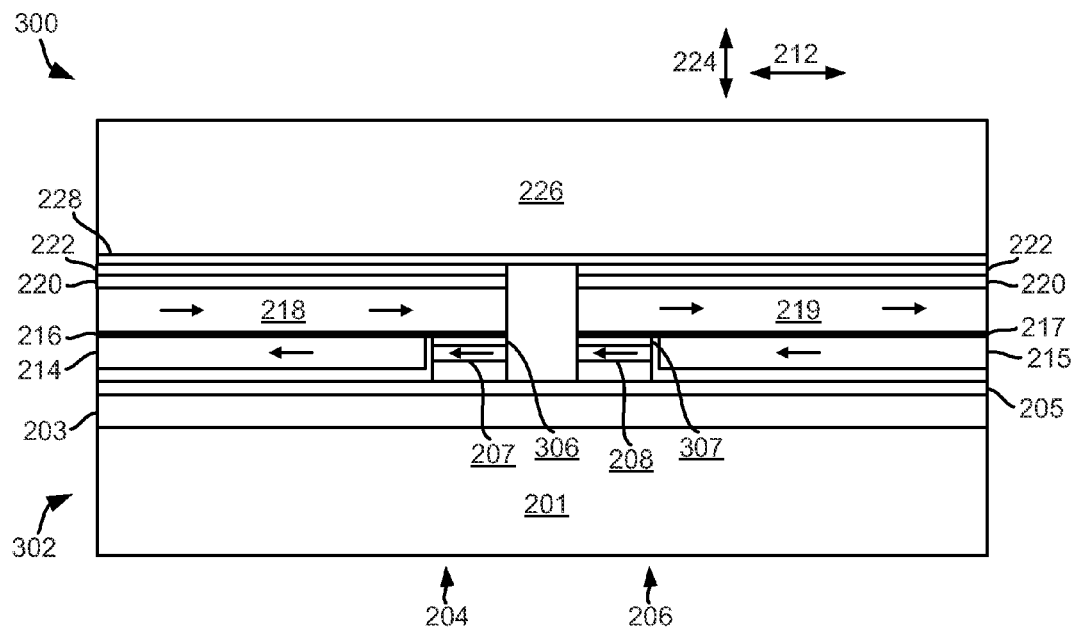
FIG. 3A is a partial view of a media facing side of a magnetic head in accordance with one embodiment.
Figure 3B:
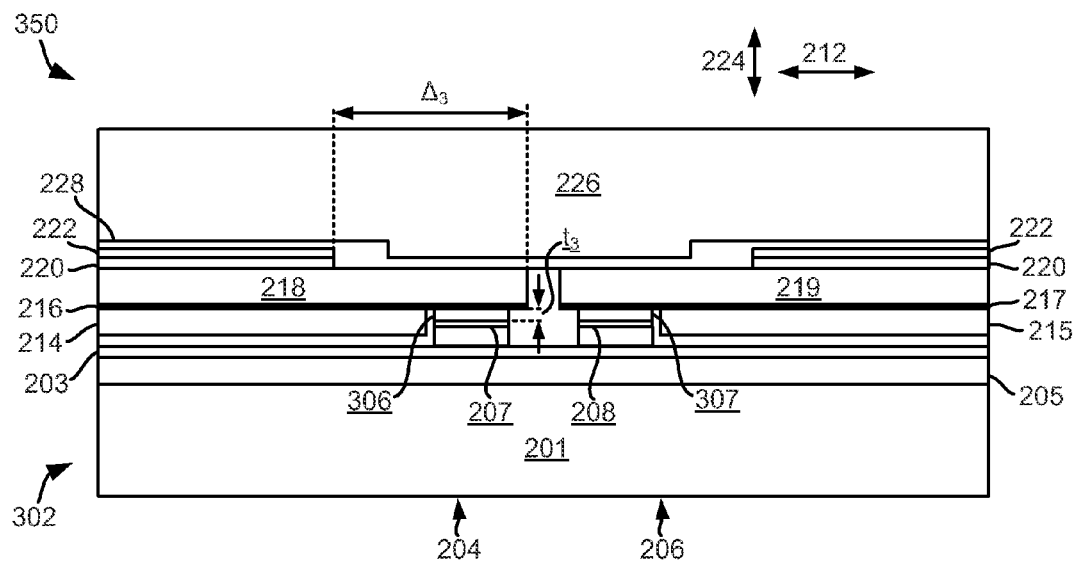
FIG. 3B is a partial view of a media facing side of a magnetic head in accordance with one embodiment.

According to some embodiments, the magnetic circuit created between each pair of magnetic and soft bias layers 218, 219, 214, 215 may provide a magnetic field at the free layers 207, 208 in the same direction as the soft bias layers 214, 215, e.g., as represented in FIG. 2B. In accordance with some approaches, each soft bias layer 214, 215 may overlie the associated free layers 207, 208 as illustrated in FIGS. 2A-2B. In further approaches, each soft bias layer 214, 215 may overlie and extend beyond the associated free layers 207, 208 in the cross-track direction 212 by a distance $\Delta_1$, e.g., as shown in FIG. 2B. The distance $\Delta_1$ which an end of each soft bias layer 214, 215 extends beyond an end of the associated free layers 207, 208 may be determined by processing alignment tolerances, e.g., determined by the process used to form the magnetic head 202 and/or any of the layers thereof. In other approaches, an end of each soft bias layer 214, 215 may overlie an end of the associated free layers 207, 208 such that the ends of the soft bias layers 214, 215 and associated free layers 207, 208 are collinear (e.g., flush) in the cross-track direction 212. According to alternate embodiments, one or both of the soft bias layer may not overlie the associated free layers 207, 208 at all, e.g., as seen in FIGS. 3A and 3B. However, it should be noted that ends of the soft bias layers 214, 215, APC layers 216, 217 and/or magnetic layers 218, 219 are preferably not recessed from the end of the corresponding free layers 207, 208.

Referring still to FIGS. 2A-2B, it is preferred that the magnetic moment of each magnetic layer 218, 219 is greater than that of the part of the associated soft bias layer 214, 215 at the location above the free layers 207, 208 to permeate the free layers 207, 208 related thereto. According to various approaches, the magnetic moment of the magnetic layers 218, 219 and/or the soft bias layers 214, 215 may be determined by the thickness, material and/or the saturation magnetic moment of the respective layer. According to an example, which is in no way intended to limit the invention, if a magnetic layer 218, 219 and an associated soft bias layer 214, 215 are made of the same material, a thickness of each magnetic layer 218, 219 is preferably greater than a combined thickness of the corresponding soft bias layers 214, 215 and the corresponding free layers 207, 208 at the location above the free layers 207, 208 to create a greater magnetic moment in the magnetic layers 218, 219 than that of the soft bias layers 214, 215 and free layers 207, 208. Put another way, it is preferred that the magnetic thickness of each magnetic layer 218, 219 is greater than a magnetic thickness of the corresponding soft bias layer 214, 215 and free layers 207, 208 at the location above the free layers 207, 208.

A thickness $t_1$ of a portion of each soft bias layer 214, 215 which overlies and extends above the free layer is preferably minimized. According to an illustrative range, the thickness $t_1$ of a portion of each soft bias layer 214, 215 which overlies and extends above the free layers 207, 208 may be less than about 5 nm, more preferably less than about 2 nm, but could be higher or lower depending on the desired embodiment. According to some approaches, the thickness $t_2$ may be determined by a fabrication limitation of the process used to form the soft bias layers 214, 215. Moreover, it is preferred that a thickness $t_2$ of the magnetic layer 218, 219 above the associated free layers 207, 208 is substantially greater than the thickness $t_1$ of the portion of the soft bias layer positioned above the associated free layers 207, 208. The substantially greater thickness $t_2$ is preferably chosen such that it induces a magnetic moment in each of the magnetic layers 218, 219 which exceeds a magnetic moment of the associated soft bias layers 214, 215, e.g., at least at a portion of the soft bias layer 214, 215 positioned above the corresponding free layers 207, 208.

Furthermore, the distance $\Delta_2$ between opposing faces of the magnetic layers 218, 219 may be tuned to induce a magnetic interaction between each magnetic layer 218, 219 and the associated free and soft bias layers 207, 208, 214, 215. However, the distance $\Delta_2$ between opposing faces of the magnetic layers 218, 219 is also sufficient enough to prevent a significant amount of flux from transferring therebetween. Thus, it is preferred that opposing faces of the magnetic layers 218, 219 are positioned apart by a distance $\Delta_2$ which is sufficient to cause each magnetic layer 218, 219 to form a magnetic circuit with the associated free layers 207, 208 and an associated soft bias layer 214, 215, without affecting the opposing magnetic layer 218, 219 and/or free layers 207, 208 associated therewith, in addition to the associated soft bias layer 214, 215. This magnetic circuit may ensure a stabilizing bias field is provided to each of the free layers 207, 208.

The dimensions of the stabilizing layers 220 and/or the upper leads 222 may vary depending on the desired embodiment as well. According to some embodiments, the stabilizing layers 220 and/or the upper leads 222 may extend from above an outer portion of the associated soft bias layer 214, 215 to at least a position above the associated free layers 207, 208. In other words, the stabilizing layers 220 and/or the upper leads 222 may extend to a position above the associated free layers 207, 208 from a position away from the free layers 207, 208 in the cross-track direction 212, e.g., as shown in FIG. 2A. In other words, an end of each stabilizing layer 220 may be recessed from an associated end of each of the magnetic layers 218, 219 at the sensor structure.

The distance $\Delta_3$ separating an end of the stabilizing layers 220 and/or the upper leads 222 from ends of the magnetic layers 218, 219 may vary based on the desired effect. In some approaches, the distance $\Delta_3$ may be about 0 such that an end of the stabilizing layers 220 and/or the upper leads 222 are collinear (e.g., flush) with ends of the magnetic layer 218, 219, e.g., as seen in FIG. 3A, which may assist in pinning end portions of the magnetic layers 218, 219. However, in other approaches, the distance $\Delta_3$ may be greater.

Moreover, it is preferred that the end of each stabilizing layer 220 facing the sensor structures 204, 206 is collinear with or extends beyond the end of each associated upper lead 222 facing the sensor structures 204, 206. However, according to some approaches, the end of each associated upper lead 222 facing the sensor structures 204, 206 may be recessed with respect to the end of each corresponding stabilizing layer 220.

The stabilizing layers 220 and/or upper leads 222 may extend in the "stripe height" direction (into the page) to a point at which they may be trimmed during a process of forming the magnetic head 202. Moreover, according to an illustrative embodiment, which is in no way intended to limit the invention, each soft bias layer 214, 215 may have the same or similar height as the associated sensor structures 204, 206, measured in the "stripe height" direction. However, other layers of the magnetic head 202, e.g., the APC layers 216, 217, magnetic layers 218, 219, stabilizing layers 220, upper leads 222, etc., may have larger heights (i.e., may extend farther in the stripe height direction) than those of the soft bias layers 214, 215 and/or sensor structures 204, 206.

In alternate embodiments, the stabilizing layers 220 and/or the upper leads 222 may extend from above an outer portion of the associated soft bias layer 214, 215 to a position which is not aligned with the associated free layers 207, 208 in the track direction 224, e.g., as depicted in FIG. 3B.

FIGS. 3A-3B depict systems 300, 350, in accordance with two embodiments. As an option, the present systems 300, 350 may be implemented in conjunction with features from any other embodiment listed herein, such as those described with reference to the other FIGS. Specifically, FIGS. 3A-3B illustrate variations of the embodiment of FIGS. 2A-2B depicting several exemplary configurations within a magnetic head 302. Accordingly, various components of FIGS. 3A-3B have common numbering with those of FIGS. 2A-2B.

However, such systems 300, 350 and others presented herein may be used in various applications and/or in permutations which may or may not be specifically described in the illustrative embodiments listed herein. Further, the systems 300, 350 presented herein may be used in any desired environment. Thus FIGS. 3A-3B (and the other FIGS.) may be deemed to include any possible permutation. For example, systems 300, 350 of FIGS. 3A, 3B respectively, are illustrated as including a magnetic head 302 having sensor structures 204, 206. However, as previously mentioned, any of the embodiments described and/or suggested herein may be implemented with additional sensor structures. According to an exemplary approach, at least one additional sensor structure may be added to the embodiments illustrated in FIGS. 3A-3B, but is in no way limited thereto. Rather, a system may include a magnetic head which has more or fewer sensor structures, e.g., depending on the desired embodiment. Moreover, depending on the desired approach, additional sensor structures may be positioned above and/or below sensor structures 204, 206 in the track direction 224 of systems 300, 350.

Referring specifically now to the embodiment of FIG. 3A, each soft bias layer 214, 215 does not overlie the associated free layers 207, 208 and caps 306, 307. Rather, each soft bias layer 214, 215 extends only to a position adjacent the associated free layers 207, 208 in the cross-track direction 212. As a result, each of the free layers 207, 208 is antiparallel coupled to the associated magnetic layers 218, 219 via antiparallel coupling layers 216, 217. Referring to the present description, it is preferred that each of the free layers 207, 208 is weakly antiparallel coupled to the associated magnetic layers 218, 219 in the sense that the free layers 207, 208 are merely stabilized and not pinned, thereby preserving the functionality of the free layer as would be appreciated by one skilled in the art upon reading the present description. Moreover, as previously mentioned, stabilizing layers 220 extend such the end of each of the stabilizing layers 220 is flush with an associated end of each magnetic layer 218, 219 at about the sensor structures 204, 206.

Looking to FIG. 3B, the magnetic head 302 includes nonmagnetic cap layers 306, 307 between each free layer 207, 208 and the associated magnetic layers 218, 219. Characteristics of the caps 306, 307 may determine the magnetic relationship between the free layers 207, 208 and the magnetic layers 218, 219, e.g., such as the thickness $t_3$ of the caps 306, 307. According to different approaches, either of the caps 306, 307 may include Ru, Ta, etc. Moreover, it is preferred that the thickness $t_3$ of caps 306, 307 is effective to cause the associated magnetic layers 218, 219 to stabilize the free layers 207, 208 without pinning the free layers 207, 208. An illustrative range for the thickness $t_3$ of caps 306, 307 may be between about 10 Å and about 40 Å, but could be higher or lower, depending on the desired embodiment.

The material composition of the cap layers 306, 307 may also have an effect on the magnetic relationship between the free layers 207, 208 and the magnetic layers 218, 219. As will be appreciated by one skilled in the art, the coupling strength of a Ru layer varies with respect to the thickness of the Ru layer. Specifically, the coupling strength between two ferromagnetic layers separated by a Ru layer include reoccurring strength peaks (maximum) and troughs (minimum) for different thicknesses thereof. According to an example, the cap layers 306, 307 and the APC layers 216, 217 may each include Ru. Thus, the cap layers 306, 307 may effectively increase the net thickness of the APC layers 216, 217 at a portion above an associated free layers 207, 208 compared to the thickness of the APC layers 216, 217 at portions away from the associated free layers 207, 208. Depending on the dimensions of the cap layers 306, 307 and the APC layers 216, 217, the combined thickness of Ru above each of the free layers 207, 208 preferably corresponds to approximately zero coupling or a weak tertiary maximum of APC strength, while the thickness of the APC layers 216, 217 at portions away from the associated free layers 207, 208 corresponds to a Ru coupling strength peak. As a result, the combined thickness of each of the APC layers 216, 217 and the corresponding cap layer 306, 307 facilitates a weak magnetic coupling between each magnetic layers 218, 219 and the corresponding free layers 207, 208, e.g., such that the free layers 207, 208 are weakly antiparallel coupled or uncoupled directly to the magnetic layers 218, 219, but not magnetically pinned; while the APC layers 216, 217 facilitate strong magnetic coupling between each magnetic layer 218, 219 and the corresponding soft bias layer 214, 215.

It follows that, depending on the construction of the cap 306, 307, the AP coupling strength between each magnetic layer 218, 219 and the respective free layers 207, 208 may be desirably diminished. Therefore, selection of the thickness $t_3$ of the cap 306, 307 may depend on the material composition of the cap 306, 307 and/or the APC layers 216, 217. Specifically, the thickness $t_3$ of the cap 306, 307 may be chosen to tune the antiparallel coupling effects experienced by the free layers 207, 208 in some approaches as would be appreciated by one skilled in the art upon reading the present description.

Furthermore, for embodiments in which each soft bias layer 214, 215 does not overlie the associated free layers 207, 208, a magnetic cap 306, 307 may be used to provide in-stack biasing. Embodiments in which magnetic caps 306, 307 provide in-stack biasing may include an additional magnetic cap paired with each of the existing magnetic caps 306, 307. According to an example, a non-magnetic cap may be positioned above each of the free layers 207, 208 for exchange decoupling thereof, in addition to a ferromagnetic cap layer which is preferably antiparallel coupled to the magnetics layers 218 and 219. In an illustrative approach, which is in no way intended to limit the invention, the aforementioned non-magnetic cap may include Ru and have a thickness of about 20 Å, but may be thicker or thinner as desired.

As mentioned above, magnetic heads as disclosed herein preferably include a cap positioned above the free layers 207, 208, e.g., which may be used to provide in-stack biasing. However, in some embodiments the free layers 207, 208 may be in direct contact with the APC layers 216, 217 (not shown). As a result, each free layer 207, 208 may be antiparallel coupled to the associated magnetic layer 218, 219 itself (e.g., as indicated by the arrows in each of the respective layers), but not magnetically pinned thereto. In such embodiments, the thickness of the APC layers 216, 217 are preferably chosen to promote antiparallel coupling between each free layer 207, 208 and the corresponding magnetic layers 218, 219 in such embodiments without pinning the magnetic orientation of the free layer 207, 208. The resulting combination of in-stack biasing and implementation of magnetically soft side shields had not previously been achieved in 2-D magnetic recording.

It should also be noted that, compared to the embodiment illustrated in FIGS. 2A-2B, the stabilizing layers 220 and the upper leads 222 of system 350 in FIG. 3B do not extend to a position above the free layers 207, 208 in the track direction 224.

Moreover, as described above, implementations having more than two sensor structures may implement a common lead. Specifically, all sensor structures which have a unique lead (e.g., electrical connection) may also share a common lead if desired. It follows that the embodiments illustrated in FIGS. 3A-3B may implement additional sensor structures which share a common lead in some approaches. Exemplary configurations and implementations of embodiments having multiple sensor structures coupled to a common lead are described in detail in U.S. patent application Ser. No. 14/194,552 filed Feb. 28, 2014 which is hereby incorporated by reference. Such embodiments may be modified according to the teachings herein to create such multi-sensor structure embodiments.

Different embodiments described herein may be used in combination with any MIMO and/or two dimensional magnetic recording (TDMR) configuration. For example, embodiments described herein may be implemented with additional sensor structures. Moreover, as previously mentioned, various embodiments presented above are preferably able to effectively bias each sensor structure of a MIMO magnetic head using a soft magnetic, side biasing layer. It should also be noted that the various embodiments described herein may be reproduced without requiring undue experimentation.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   a magnetic head having sensor structures disposed laterally along a cross-track direction, each sensor structure having a free layer;
   a soft bias layer positioned laterally to each sensor structure;
   an antiparallel coupling layer above each soft bias layer,
   a magnetic layer above each antiparallel coupling layer, wherein magnetic moments of the soft bias layer and the magnetic layer are antiparallel coupled; and
   a stabilizing layer above each magnetic layer for stabilizing a magnetic orientation of the magnetic layer,
   wherein opposing faces of the magnetic layers are positioned apart by a distance that causes each magnetic layer to form a magnetic circuit with the associated free layer and the associated soft bias layer.

2. The system as recited in claim 1, wherein each soft bias layer overlies the associated free layer.

3. The system as recited in claim 2, wherein a thickness of a portion of each soft bias layer above the free layer is less than about 5 nm.

4. The system as recited in claim 1, wherein each soft bias layer overlies and extends beyond the associated free layer in the cross-track direction.

5. The system as recited in claim 1, wherein each soft bias layer does not overlie the associated free layer.

6. The system as recited in claim 5, wherein each free layer is antiparallel coupled to the associated magnetic layer via the antiparallel coupling layer.

7. The system as recited in claim 6, comprising a cap between each free layer and the associated magnetic layer, the cap having a thickness effective to cause the associated magnetic layer to stabilize the free layer but not pin the free layer.

8. The system as recited in claim 1, wherein a thickness of the magnetic layer above the associated free layer is greater than a thickness of a portion of the soft bias layer positioned above the associated free layer.

9. The system as recited in claim 1, comprising an upper lead above each stabilizing layer and in electrical communication with each magnetic layer.

10. The system as recited in claim 1, wherein a magnetic moment of each magnetic layer exceeds a magnetic moment of any portion of the soft bias layer above the associated free layer.

11. The system as recited in claim 1, wherein the sensor structures share a common lower lead.

12. The system as recited in claim 1, comprising an upper shield above the magnetic layers, and an insulating layer between the upper shield and the magnetic layers for insulating the upper shield from the magnetic layers.

13. The system as recited in claim 1, comprising at least one additional sensor structure positioned above and/or below the sensor structures in a track direction.

14. The system as recited in claim 1, wherein each stabilizing layer extends from above an outer portion of the associated soft bias layer to at least to a position above the associated free layer.

15. The system as recited in claim 14, wherein an end of each stabilizing layer is flush with an associated end of each magnetic layer at the sensor structure.

16. The system as recited in claim 14, wherein an end of each stabilizing layer is recessed from an associated end of each magnetic layer at the sensor structure.

17. The system as recited in claim 1, comprising:

a magnetic medium;

a drive mechanism for passing the magnetic medium over magnetic head; and a controller electrically coupled to the magnetic head for controlling operation of the at least one magnetic head.

18. A system, comprising:

a magnetic head having sensor structures disposed laterally along a cross-track direction, each sensor structure having a free layer;

a soft bias layer positioned laterally to each sensor structure;

an antiparallel coupling layer above each soft bias layer;

a magnetic layer above each antiparallel coupling layer, wherein magnetic moments of the soft bias layer and the magnetic layer are antiparallel coupled; and a stabilizing layer above each magnetic layer for stabilizing a magnetic orientation of the magnetic layer, wherein a magnetic moment of each magnetic layer exceeds a magnetic moment of any portion of the soft magnetic layer above the associated free layer, wherein opposing faces of the magnetic layers are positioned apart by a distance that causes each magnetic layer to form a magnetic circuit with the associated free layer and the associated soft bias layer.

19. The system as recited in claim 18, wherein each soft bias layer overlies the associated free layer.

20. The system as recited in claim 18, wherein each soft bias layer does not overlie the associated free layer.

21. The system as recited in claim 18, comprising:

a magnetic medium;

a drive mechanism for passing the magnetic medium over the magnetic head; and a controller electrically coupled to the magnetic head for controlling operation of the at least one magnetic head.

\* \* \* \* \*